United States Patent
Yoon (10) Patent No.: US 7,903,582 B2
(45) Date of Patent: Mar. 8, 2011

(54) APPARATUS AND METHOD FOR CHANNEL ESTIMATION IN WIRELESS COMMUNICATION SYSTEM

(75) Inventor: Eun-Chul Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 12/321,627

(22) Filed: Jan. 23, 2009

(65) Prior Publication Data
US 2009/0190489 A1 Jul. 30, 2009

(30) Foreign Application Priority Data
Jan. 25, 2008 (KR) .................. 10-2008-0007797

(51) Int. Cl.
*G01R 31/08* (2006.01)
(52) U.S. Cl. ...................... 370/252; 370/235
(58) Field of Classification Search .......... 370/200–253, 370/272–390, 431–546; 709/203
See application file for complete search history.

(56) References Cited

U.S. PATENT DOCUMENTS

| | | | |
|---|---|---|---|
| 6,275,483 B1 * | 8/2001 | Papasakellariou et al. | 370/335 |
| 2007/0066242 A1 * | 3/2007 | Yi et al. | 455/69 |
| 2009/0010319 A1 * | 1/2009 | Sun et al. | 375/224 |
| 2010/0002597 A1 * | 1/2010 | Sampath et al. | 370/252 |

* cited by examiner

*Primary Examiner* — Ricky Ngo
*Assistant Examiner* — Iqbal Zaidi (57) ABSTRACT

An apparatus and method for channel estimation in a wireless communication system are provided. The apparatus includes a Channel Quality Indicator (CQI) memory unit for collecting a predetermined number of pieces of channel information for two or more mobile stations (MSs), a CQI DIFference (CQIDIF) memory unit for storing a predetermined number of differences between consecutive pieces of channel information with respect to each MS, a CQIDIF dispersion unit for calculating a predetermined number of dispersions between two pieces of consecutive channel information with respect to each MS, and a second comparator for comparing a dispersion for differences between the two consecutive pieces of channel information with a second threshold to identify a Rician channel.

20 Claims, 7 Drawing Sheets

APPARATUS AND METHOD FOR CHANNEL ESTIMATION IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jan. 25, 2008 and assigned Serial No. 10-2008-0007797, the entire disclosure of which is hereby incorporated by reference.

TECHNICAL FIELD OF THE INVENTION

The present invention relates to channel estimation in a wireless communication system. More particularly, the present invention relates to an apparatus and method for selecting a Modulation & Coding Scheme (MCS) level or a Multiple Input Multiple Output (MIMO) operation mode by estimating a Rician channel.

BACKGROUND OF THE INVENTION

In general, wireless communication systems are developed to support mobility of Mobile Stations (MSs). To ensure the mobility of MSs, a wireless channel is established between a Base Station (BS) and a MS in the wireless communication system. The established channel is used to perform voice and data communication. Therefore, while moving at a low velocity or a high velocity, the MS transmits and receives data through an occasionally changing wireless channel path and environment. Accordingly, the wireless communication system estimates a transmit (Tx) channel of the MS, and extracts data according to the result of estimation.

A method of estimating a channel of an MS may be used to determine a data transfer rate by estimating a velocity of the MS. In a known method of estimating the velocity of an MS, a BS estimates a Level Crossing Rate (LCR) by using Channel Quality Indicator (CQI) information periodically reported by the MS to the BS, and the velocity of the MS is estimated according to the estimated LCR. In this method, a filtered CQI curve is obtained by weight-averaging CQI values received using not only a current CQI value but also CQI values received through previous frames, and an LCR is measured by counting how many times the curve crosses an instantaneous CQI curve. For example, the greater the number of crossings, the faster the velocity of the MS. Further, the less the number of crossings, the slower the velocity of the MS.

Figure 6:
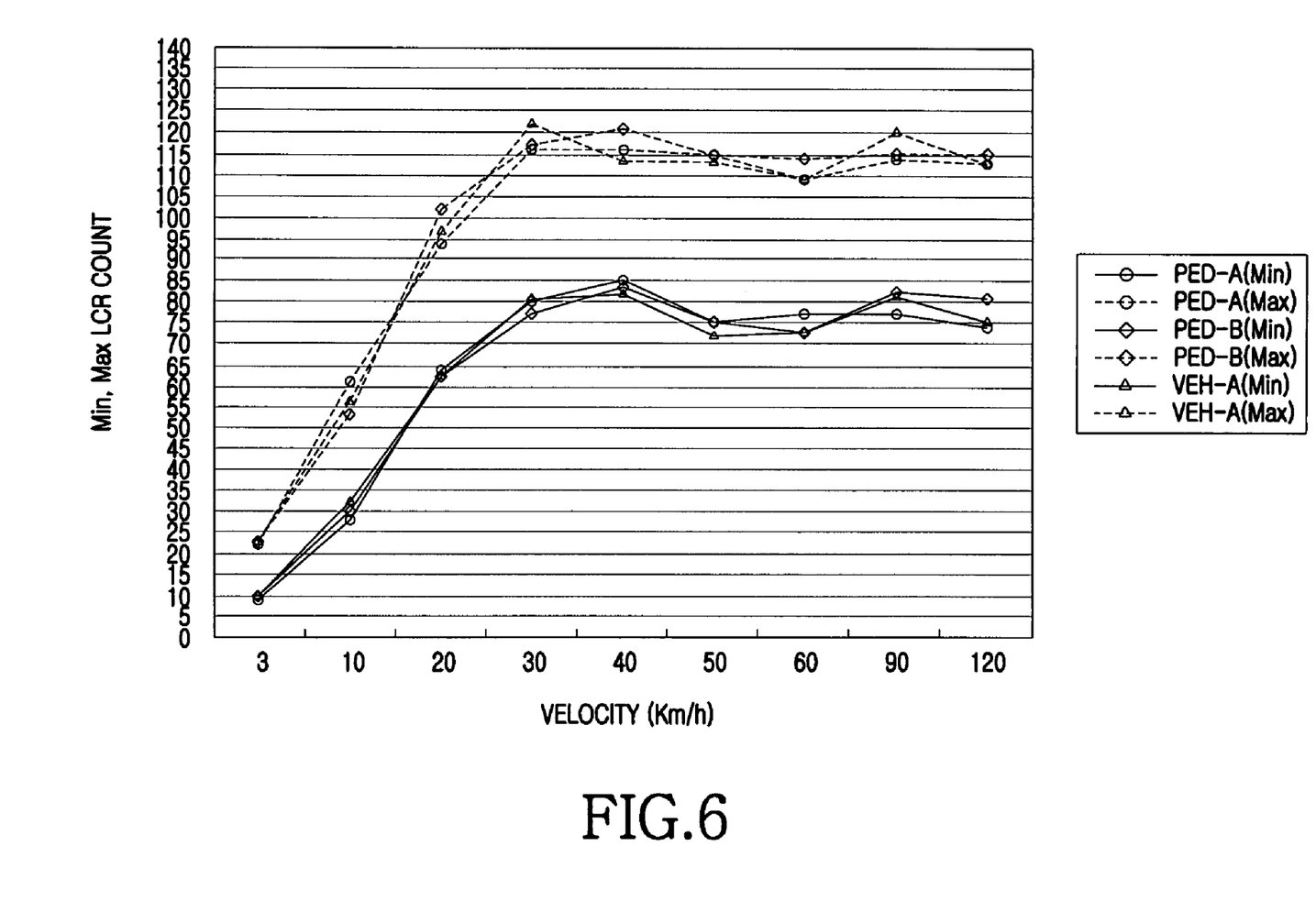
FIG. 6 is a graph illustrating an estimated velocity of a mobile station (MS) with respect to a level crossing rate (LCR)

When the velocity of the MS is estimated using the LCR, it is difficult to accurately estimate the velocity of the MS due to significant changes in the estimated LCR value. Therefore, only an approximate range of the velocity of the MS can be estimated using the LCR. If the velocity is greater than or equal to a specific velocity, it is difficult to know the approximate range when using the LCR. A graph obtained by estimating the velocity of the MS with respect to the LCR is shown in FIG. 6. In the graph of FIG. 6, the horizontal axis represents velocity, and the vertical axis represents an LCR count value. If LCR=25, it can be estimated that the velocity of the MS is 3 km/hr~10 km/hr. If LCR=90, the fact that the velocity of the MS is greater than or equal to 20 km/hr is only information that can be obtained.

An LCR method is implemented with various elements, such as, a memory for storing instantaneous CQI values reported during hundreds of frames, a memory for storing weight-averaged CQI values during hundreds of frames, a counter for counting the number of crossings between a curve representing the instantaneous CQI values and a curve representing the weight-averaged CQI values, and a memory for storing data used to estimate a velocity by comparing LCRs. These elements need to be separately managed for all MSs connected to a BS, which leads to increased cost in system implementation. Further, when the velocity of the MS is estimated using LCR, the velocity is estimated not in a frame unit but in a unit of hundreds of frames. Therefore, it is difficult to estimate the velocity of the MS when the velocity of the MS instantaneously changes. Furthermore, the LCR value may increase again when a channel is similar to a Rician channel, and thus it is difficult to distinguish the Rician channel from a channel having a different velocity by using the LCR.

Accordingly, when the velocity of the MS is estimated using the conventional LCR method, it is difficult to estimate the velocity of the MS in an accurate and rapid manner, and large memory capacity is required.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for accurately distinguishing a Rician channel in every frame by using small memory capacity, and an apparatus and method for using the discrimination result of the Rician channel.

In accordance with an aspect of the present invention, an apparatus for estimating a channel in a wireless communication system is provided. The apparatus includes a Channel Quality Indicator (CQI) memory unit for collecting a predetermined number of pieces of channel information for two or more mobile stations, a CQI DIFference (CQIDIF) memory unit for storing a predetermined number of differences between consecutive pieces of collected channel information with respect to each MS, a CQIDIF dispersion unit for calculating a predetermined number of dispersions between two consecutive pieces of channel information with respect to each MS, and a comparator for comparing a dispersion for differences between two consecutive pieces of consecutive channel information with a second threshold to identify a Rician channel.

In accordance with another aspect of the present invention, a method of estimating a channel in a wireless communication system is provided. The method includes collecting a predetermined number of pieces of channel information for each MS, storing a predetermined number of differences between consecutive pieces of collected channel information with respect to each MS, calculating a predetermined number of dispersions between two consecutive pieces of channel information with respect to each MS, and comparing a dispersion for differences between two consecutive pieces of consecutive channel information with a second threshold to identify a Rician channel.

In accordance with another aspect of the present invention, a method of identifying a Rician channel to be used in an Orthogonal Frequency Division Multiplexing (OFDM)-based communication system is provided. The method includes receiving channel information for each MS, calculating a dispersion for differences between two consecutive channel values by using channel information periodically fed back for each MS to identify the Rician channel, and regulating a Modulation & Coding Scheme (MCS) level selected according to the channel discrimination result.

In accordance with another aspect of the present invention, an apparatus for identifying a Rician channel to be used in an OFDM-based communication system is provided. The apparatus includes a channel discriminator for receiving channel information from each MS and for calculating a dispersion for differences between two consecutive channel values by using channel information periodically fed back for each MS to identify the Rician channel; and an MCS regulator for regulating an MCS level selected according to the channel discrimination result.

In accordance with another aspect of the present invention, a method of identifying a Rician channel to be used in a multiple antenna system is provided. The method includes receiving channel information for each MS, calculating a dispersion for differences between two consecutive channel values by using channel information periodically fed back for each MS to identify the Rician channel, and switching a Multiple Input Multiple Output (MIMO) operation mode in a Rician channel environment.

In accordance with another aspect of the present invention, an apparatus for identifying a Rician channel to be used in a multiple antenna system is provided. The apparatus includes a channel discriminator for calculating a dispersion for differences between two consecutive channel values by using channel information periodically fed back for each MS to identify the Rician channel, and a MIMO switching unit for switching a MIMO operation mode in a Rician channel environment.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, an apparatus and method for identifying a Rician channel in a wireless communication system, and an apparatus and method for using the identified Rician channel will be described.

Figure 1A:
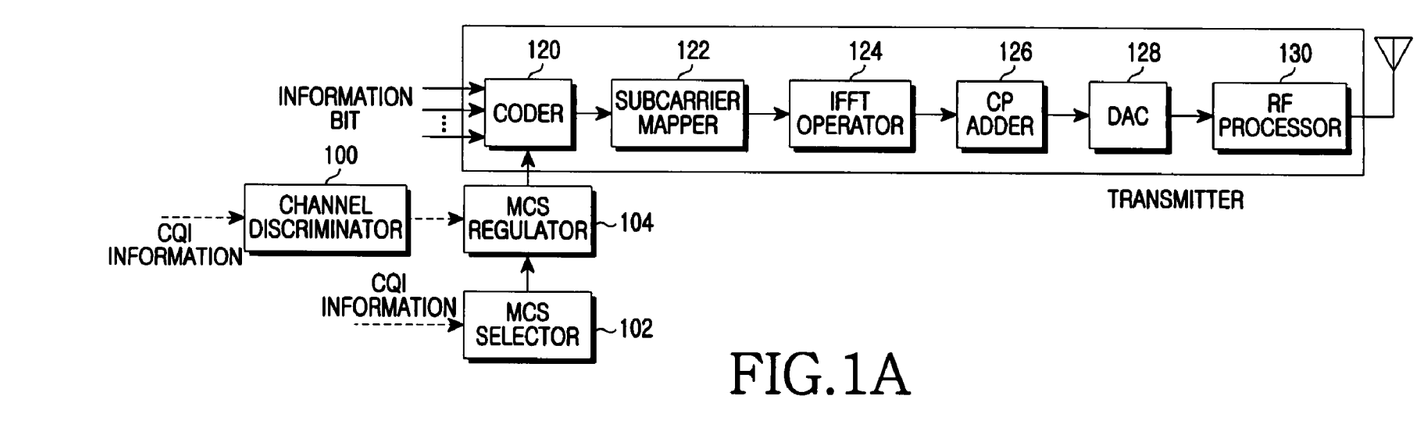
FIG. 1A is a block diagram illustrating a transmitter for identifying a Rician channel to be used in an Orthogonal Frequency Division Multiplexing (OFDM)-based communication system according to an exemplary embodiment of the present invention.

FIG. 1A is a block diagram illustrating a transmitter for identifying a Rician channel to be used in an Orthogonal Frequency Division Multiplexing (OFDM)-based communication system according to an exemplary embodiment of the present invention.

Referring to FIG. 1A, the transmitter includes a channel discriminator 100, a Modulation & Coding Scheme (MCS) selector 102, an MCS regulator 104, a coder 120, a subcarrier mapper 122, an Inverse Fast Fourier Transform (IFFT) operator 124, a Cyclic Prefix (CP) adder 126, a Digital-to-Analog Converter (DAC) 128, and a Radio Frequency (RF) processor 130.

By using Channel Quality Indicator (CQI) information periodically fed back for each mobile station (MS), the channel discriminator 100 calculates a dispersion of differences between two consecutive CQI values to identify the Rician channel. Then, the channel discriminator 100 reports the result to the MCS regulator 104. The MCS selector 102 selects an MCS level for each MS by periodically receiving the CQI information for each MS, and outputs the selected MCS level to the MCS regulator 104. If the Rician channel is identified by the channel discriminator 100, the MCS regulator 104 regulates the MCS level selected by the MCS selector 102 up to a predetermined level and outputs the regulated MCS level to the coder 120. If the Rician channel is not identified, the MCS regulator 104 outputs to the coder 120 the MCS level selected by the MCS selector 102 without regulation.

In a conventional method of selecting an MCS level, a base station (BS) broadcasts a preamble signal to all MSs instead of beamforming the preamble signal to a specific MS, each MS feeds back CQI information according to the preamble signal, and the BS selects the MCS level using the CQI information. The MCS level selected using the conventional method cannot properly use a beamforming gain. Therefore, a throughput gain cannot be obtained using the beamforming gain even if the BS applies beamforming by using multiple antennas. Since the beamforming gain becomes significant particularly in a slow channel environment, it can be said that the beamforming gain is greatest when the MS is in a Rician channel environment. Accordingly, when the MCS level is selected by identifying the Rician channel, a system throughput performance may be improved.

The coder 120 generates code symbols by coding an information bit-stream according to the MCS level received from the MCS regulator 104. The coder 120 may use a Convolution Code (CC), a Block Turbo Code (BTC), and so forth. The subcarrier mapper 122 generates modulation symbols by modulating the code symbols received from the coder 120 according to a specific modulation scheme, and maps the data to a predetermined subcarrier. The IFFT operator 124 transforms the data received from the subcarrier mapper 122 into time-domain data by performing an IFFT operation on the data. The CP adder 126 adds a guard interval to the data received from the IFFT operator 124. The DAC 128 converts sample data received from the CP adder 126 into an analog signal. The RF processor 130 converts a baseband signal received from the DAC 128 and transmits the RF signal through an antenna.

Figure 1B:
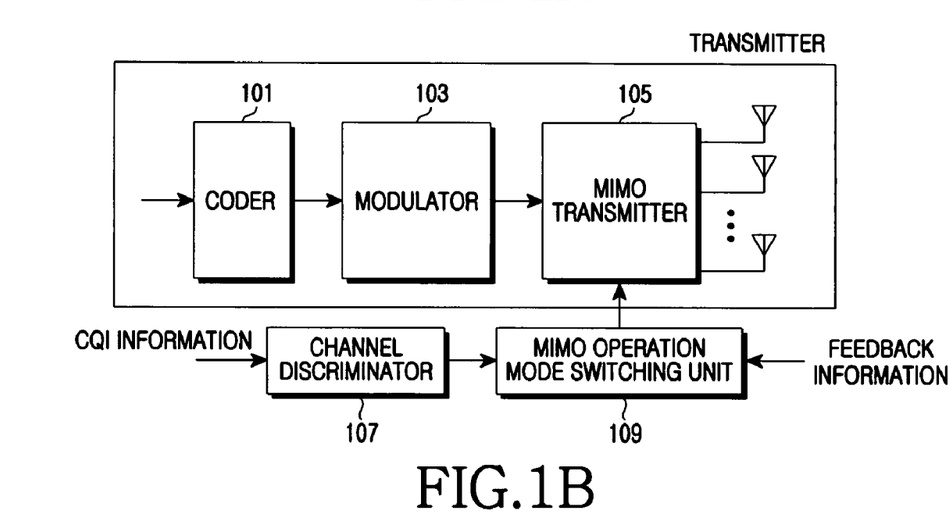
FIG. 1B is a block diagram illustrating a transmitter for identifying a Rician channel to be used in a multiple antenna system according to an exemplary embodiment of the present invention.

FIG. 1B is a block diagram illustrating a transmitter for identifying a Rician channel to be used in a multiple antenna system according to an exemplary embodiment of the present invention.

Referring to FIG. 1B, the transmitter includes a coder 101, a modulator 103, a Multiple Input Multiple Output (MIMO) transmitter 105, a channel discriminator 107, and a MIMO operation mode switching unit 109.

The coder 101 generates code symbols by coding an information bit-stream. The coder 101 may use a Convolution Code (CC), a Block Turbo Code (BTC), and so forth. The modulator 103 generates modulation symbols by modulating the code symbols received from the coder 101.

The MIMO transmitter 105 receives MIMO operation mode information from the MIMO operation mode switching unit 109 and transmits the modulation symbols received from the modulator 103 through a plurality of transmit (Tx) antennas according to a corresponding MIMO operation mode. The MIMO operation mode is classified into a Spatial Multiplexing (SM) mode and a Space-Time Block Code (STBC) mode. In the SM mode, the transmitter transmits different pieces of data through the plurality of antennas, and a signal of each antenna undergoes independent fading. In the STBC mode, a Tx diversity can be obtained by transmitting the same data through a plurality of Tx antennas.

The channel discriminator 107 calculates a dispersion of differences between two consecutive CQI values by using CQI information periodically fed back for each MS to identify the Rician channel, and reports the result to the MIMO operation mode switching unit 109.

The MIMO operation mode switching unit 109 determines the MIMO operation mode by receiving feedback information for each MS. However, if the SM mode is determined in the Rician channel environment, the MIMO operation mode switching unit 109 switches the SM mode to the STBC mode and reports the switching result to the MIMO transmitter 105.

In general, a throughput performance of the SM mode is superior to that of the STBC mode. According to a simulation result, throughput deterioration occurs when the transmitter operates in the SM mode in the Rician channel environment. This is because a rank of a MIMO channel is 1 (or a the MIMO channel has a poor channel state) in the Rician channel environment, and thus several data streams cannot be transmitted through the channel. That is, the SM mode can increase the throughput in most channel environments, but in case of the Rician channel, throughput deterioration can be avoided when the STBC mode is used instead of the SM mode even if CQI information is large.

Figure 2:
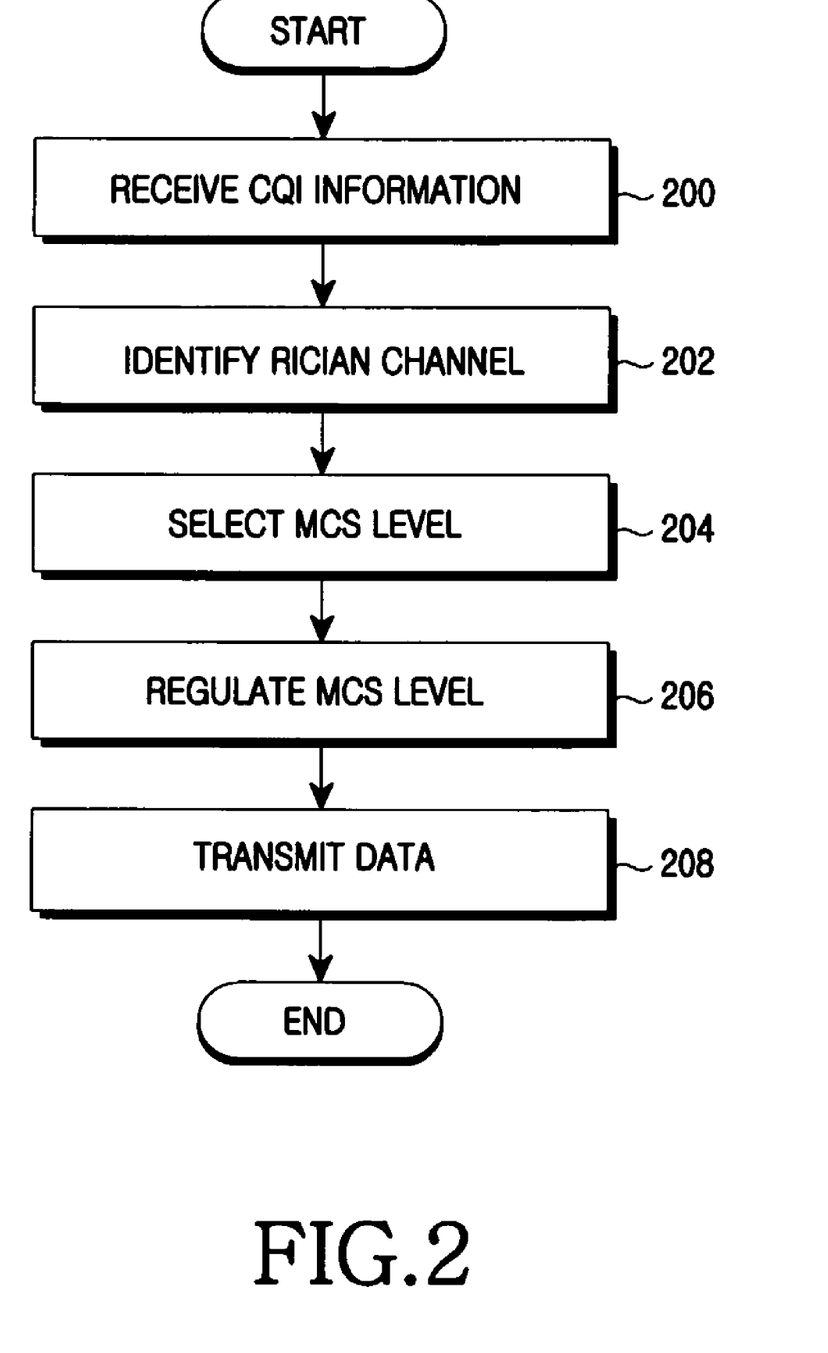
FIG. 2 is a flowchart illustrating a process of identifying a Rician channel in an OFDM-based communication system according to an exemplary embodiment of the present invention.

FIG. 2 is a flowchart illustrating a process of identifying a Rician channel in an OFDM-based communication system according to an exemplary embodiment of the present invention.

Referring to FIG. 2, a transmitter receives CQI information for each MS in step 200.

In step 202, by using the CQI information periodically fed back for each MS, the transmitter calculates a dispersion of differences between two consecutive CQI values to identify the Rician channel.

In step 204, the transmitter selects an MCS level by using the CQI information for each MS.

In step 206, the transmitter regulates the MCS level according to the result of the Rician channel. For example, if the Rician channel is identified, the selected MCS level is regulated by increasing the MCS level up to a predetermined level, and if the Rician channel is not identified, the MCS level is not regulated.

In step 208, the transmitter transmits data according to the regulated MCS level.

Thereafter, the procedure of FIG. 2 ends.

Figure 3:
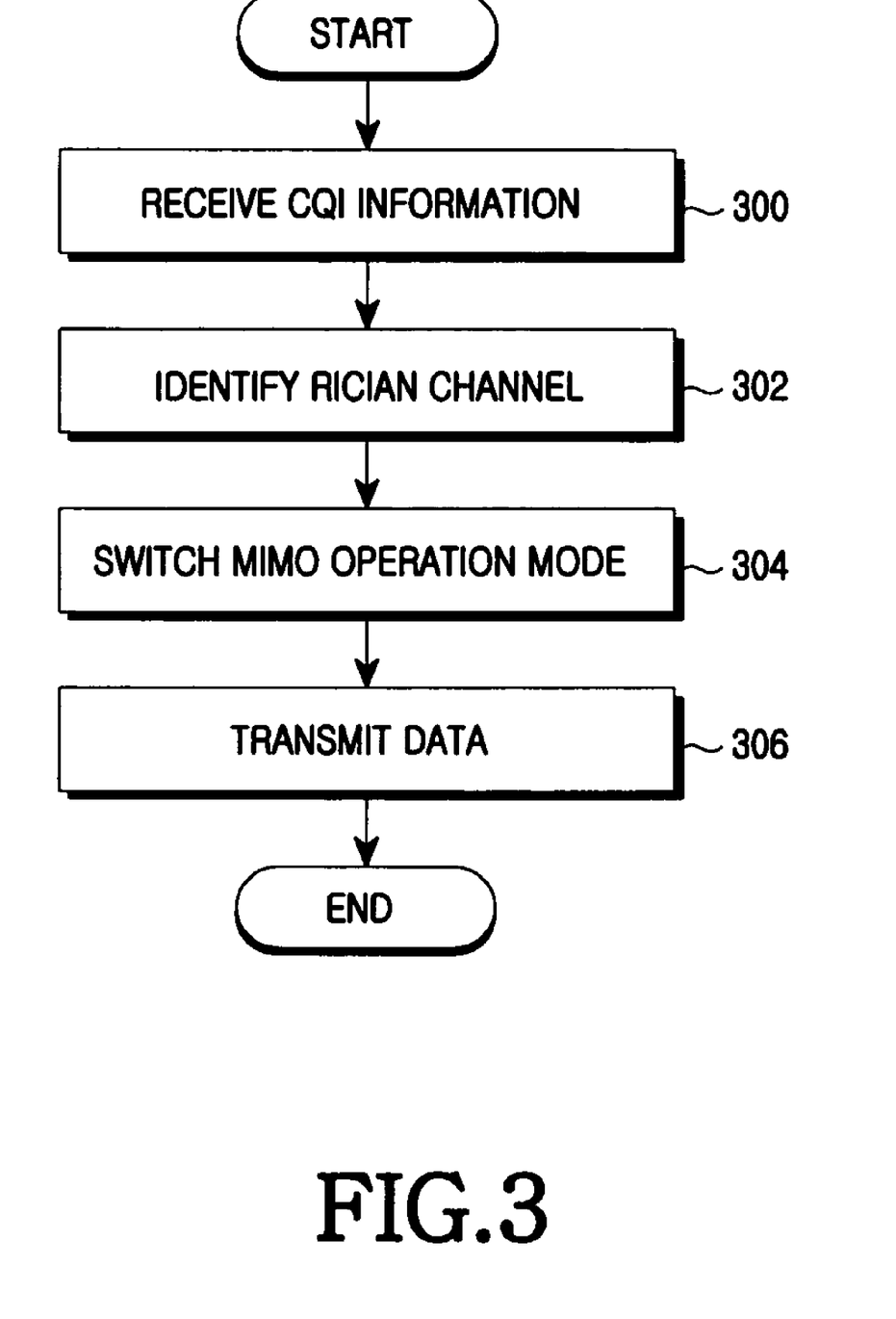
FIG. 3 is a flowchart illustrating a process of identifying a Rician channel to be used in a multiple antenna system according to an exemplary embodiment of the present invention.

FIG. 3 is a flowchart illustrating a process of identifying a Rician channel to be used in a multiple antenna system according to an exemplary embodiment of the present invention.

Referring to FIG. 3, a transmitter receives CQI information for each MS in step 300.

In step 302, by using the CQI information periodically fed back for each MS, the transmitter calculates a dispersion between two consecutive CQI values to identify the Rician channel.

In step 304, the transmitter switches a MIMO operation mode from an SM mode to an STBC mode, wherein the SM mode is determined by the feedback information for each MS in a Rician channel environment.

In step 306, the transmitter transmits data according to the MIMO operation mode.

Thereafter, the procedure of FIG. 3 ends.

Figure 4:
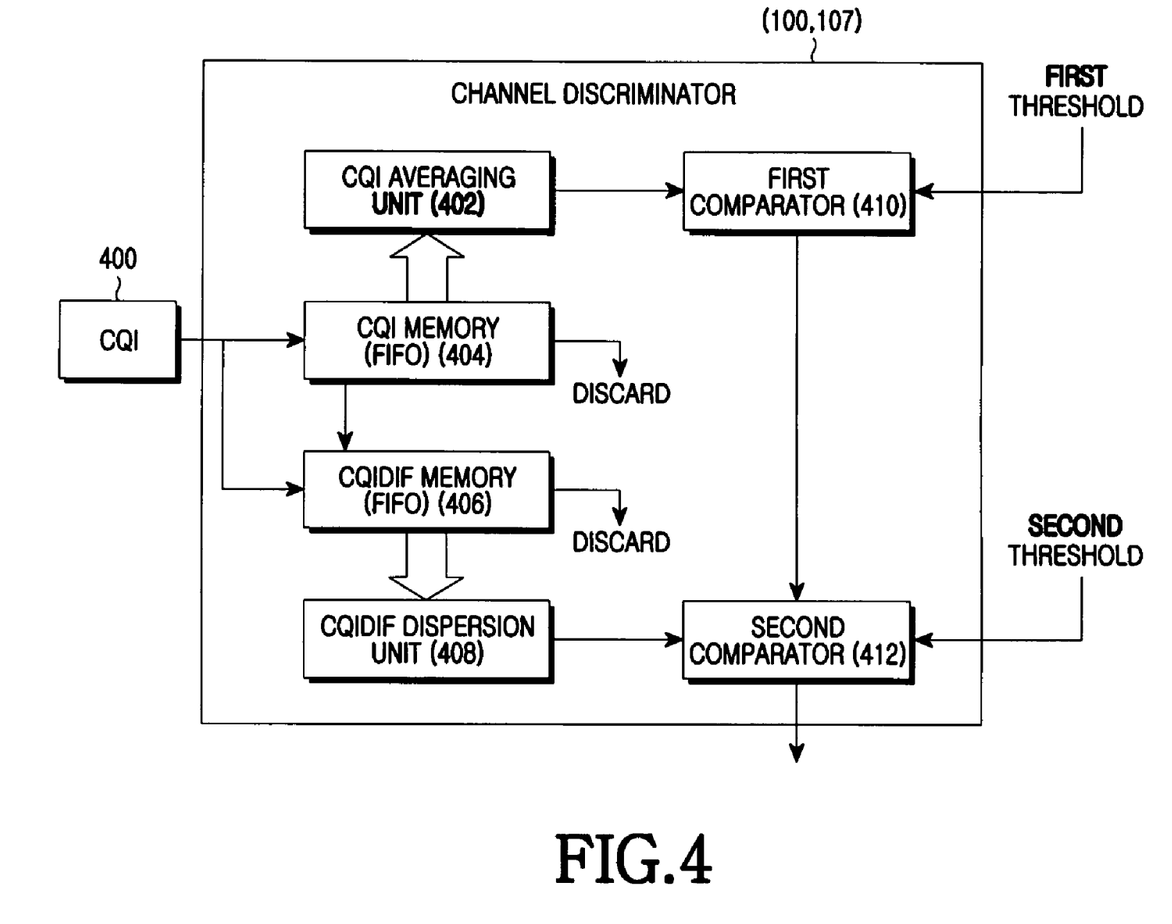
FIG. 4 illustrates a detailed structure of a channel discriminator for identifying a Rician channel according to an exemplary embodiment of the present invention.

FIG. 4 illustrates a detailed structure of the channel discriminators 100 and 107 for identifying a Rician channel according to an exemplary embodiment of the present invention.

Referring to FIG. 4, the channel discriminators 100 and 107 are constructed of a CQI memory unit 404 for storing a plurality of CQI values 400 for each MS where the CQI values 400 are fed back from corresponding MSs, a CQIDIF memory unit 406 for storing a plurality of difference values between two consecutive CQI values (hereinafter, the difference value is referred to as CQIDIF), a CQI averaging unit 402 for calculating average values of the CQI values stored in the CQI memory 404, and a CQIDIF dispersion unit 408 for obtaining dispersion values of the CQIDIF values stored in the CQIDIF memory 406. The memory units 404 and 406 may be First-In-First-Out (FIFO) queues. That is, whenever a new value is input, the new input value is stored by shifting previously stored values in one direction, and an oldest value is discarded. Further, a first comparator 410 is provided to compare whether an average CQI value received from the CQI averaging unit 402 is within a first threshold range and to output the comparison result to a second comparator 412. If the average CQI value is within the first threshold range, the second comparator 412 compares a dispersion value with a second threshold, wherein the dispersion value is for CQIDIF values for respective MSs and is received from the CQIDIF dispersion unit 408. If the average CQI value is not within the first threshold range, the second comparator 412 does not compare the dispersion value with the second threshold.

Figure 7:
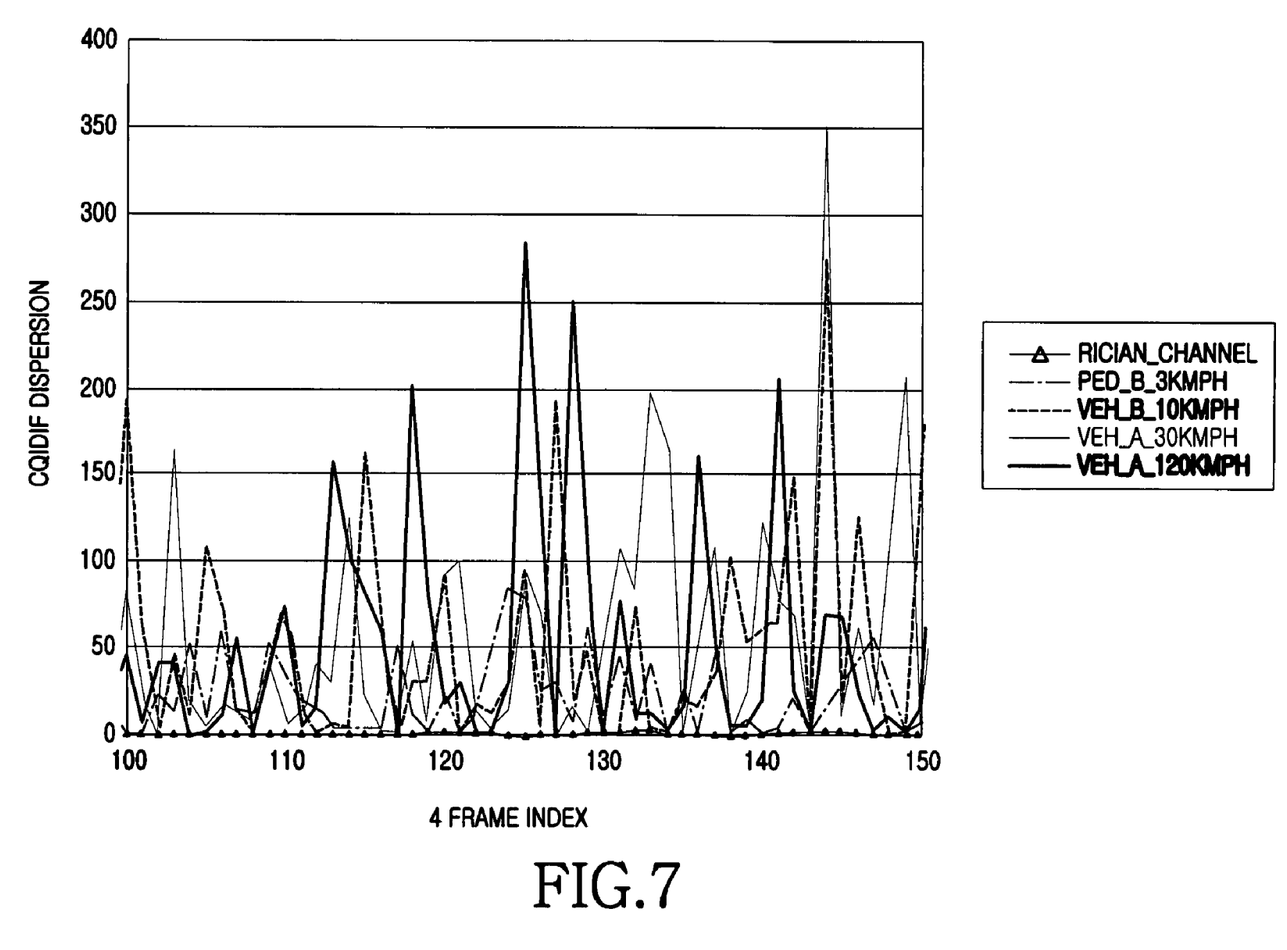
FIG. 7 is a graph illustrating a channel quality indicator difference (CQIDIF) dispersion with respect to several types of wireless channels.

According to implementations, the number of CQI values and CQIDIF values stored in the memory units may change. A graph showing a CQIDIF dispersion with respect to several types of wireless channels is illustrated in FIG. 7. Referring to FIG. 7, a measurement value is less than a threshold (i.e., 1) only when a Rician channel is used, and is greater than the threshold when other channels are used. This is because a velocity of an MS is slow in the Rician channel, and thus a CQIDIF dispersion is not high.

Figure 5:
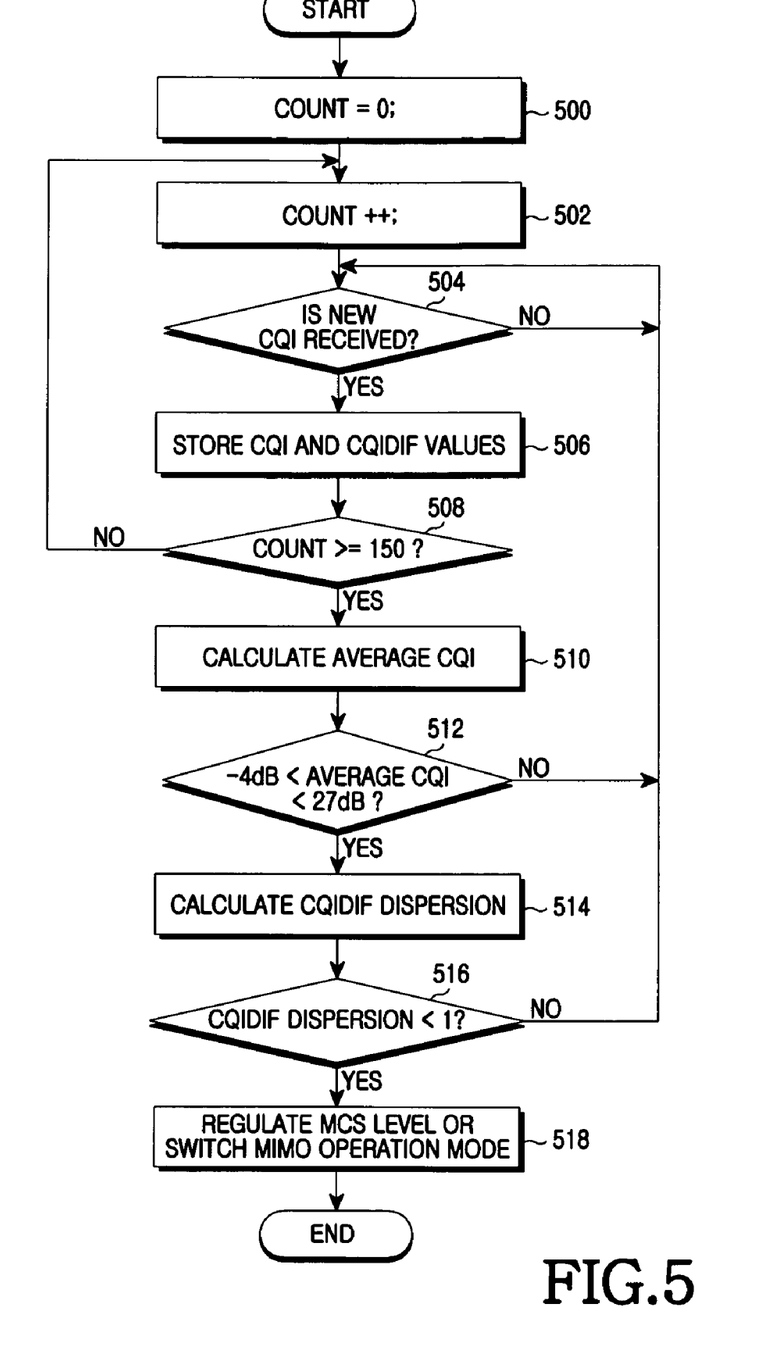
FIG. 5 is a flowchart illustrating a process of identifying a Rician channel in a wireless communication system according to an exemplary embodiment of the present invention.

FIG. 5 is a flowchart illustrating a process of identifying a Rician channel in a wireless communication system according to an exemplary embodiment of the present invention.

Referring to FIG. 5, a BS sets a count value to 0 in step 500, and increments the count value by 1 in step 502.

In step 504, the BS determines whether a new CQI is received. If a new CQI is received, proceeding to step 506, the BS stores a CQI value and a CQIDIF value.

In step 508, the BS compares the count value with 150. If the count value is less than 150, steps 502 to 506 are repeated.

In other words, when the MS performs initial network entry, the BS does not change the MCS level selected using the CQI during first 150 frames. This is a sort of warm-up time, and it takes about 3 seconds. In a broadband wireless communication system (e.g., Institute of Electrical and Electronics Engineers (IEEE) 802.16), the MS generally feeds back the CQI to the BS periodically (e.g., once in every four frames). When the BS receives a new CQI, the BS stores the received CQI in a CQI queue. The CQI queue stores a plurality of CQI values in total. Likewise, a CQIDIF queue stores a newly calculated CQIDIF. During warm-up time, an operation of storing the CQI and the CQIDIF values is repeated whenever a new value is received while waiting for a new CQI value. The warm-up time may vary according to implementations.

If the count value is greater than or equal to 150 in step 508, proceeding to step 510, the new CQI value is stored in the queue, and thereafter the stored N CQI values are averaged.

If an average CQI is great than or equal to 27 dB or less than or equal to −4 dB in step 512, proceeding to step 504, the BS repeats steps 504 to 510 (herein, a value of 27 dB and a value of −4 dB are referred to as a first threshold). This is because a significantly strong channel gain or a significantly weak channel gain may be generated due to channel fading, and thus the CQI value may have a highest value (i.e., 27 dB) or a lowest value (i.e., −4 dB). In such a channel fading environment, the same measurement result as in the Rician channel can be obtained, and thus the MCS level selected by using the CQI may not change or the MIMO operation mode may not change. That is, if the CQI value is great than or equal to 27 dB or less than or equal to −4 dB, the MCS level and the MIMO operation mode are changed by using the CQI value without performing channel discrimination.

If the average CQI is between −4 dB and 27 dB in step 512, proceeding to step 514, a dispersion of a plurality of CQIDIF values stored in the CQIDIF queue is calculated.

If the dispersion of the CQIDIF values is less than 1 in step 516, the BS determines that the Rician channel is identified, and the procedure proceeds to step 518. Otherwise, if the dispersion is greater than or equal to 1, the BS determines that the Rician channel is not identified, and repeats steps 504 to 514.

In step 518, the BS regulates the MCS level selected using the CQI value or switches the MIMO operation mode. Now, an operation of regulating the MCS level and switching the MIMO operation mode after identifying the Rician channel will be described.

When the BS determines that the Rician channel is identified, a downlink beamforming function can be used to regulate the MCS level selected using the CQI. For example, when the BS determines that the Rician channel is identified, the MCS level selected using the CQI is increased. As such, the MCS level is regulated to be higher than the selected MCS level, and thus a throughput performance can be increased according to a beamforming gain. If the MCS level already has reached a maximum level, the MCS level is no longer increased, and thus the changed MCS level does not exceed a maximum permissible MCS level.

Alternatively, when the BS determines that the Rician channel is not identified, the determination result can be used to select the MIMO operation mode. For example, if the Rician channel is used as a channel of the MS, a rank of the channel is 1 (or a MIMO channel has a poor channel state), and thus it is difficult to apply the SM mode in which several data streams are transmitted through the channel. If the channel state is good, the SM mode is further advantageous over the STBC mode in terms of increasing throughput. However, when using the Rician channel, the STBC mode can be further advantageous over the SM mode in terms of increasing throughput. Accordingly, when the BS determines that the Rician channel is identified, throughput deterioration can be avoided by switching the MIMO operation mode from the SM mode to the STBC mode.

Thereafter, the procedure of FIG. 5 ends.

In FIG. 4 and FIG. 5, the CQIDIF dispersion is used as a reference value for determining whether the Rician channel is used as a wireless channel, and a constant 1 is used as a threshold to be compared with the measured dispersion. However, the threshold may vary according to a measurement rule.

As described above, the transmitter can determine the Rician channel to effectively select the MCS level in downlink beamforming. Further, when the multiple antenna system operates in the SM mode, throughput can be increased by switching the SM mode to the STBC mode.

According to exemplary embodiments of the present invention, a dispersion of differences between two consecutive CQI values is used to identify a Rician channel, and thus memory capacity can be reduced in comparison with the conventional method. Further, the Rician channel can be accurately identified in every frame. Furthermore, the result of the Rician channel can be used to regulate an MCS level or to switch a MIMO operation mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for estimating a channel in a wireless communication system, the apparatus comprising:
   a Channel Quality Indicator (CQI) memory unit configured to collect a predetermined number of channel information of a mobile station (MS);
   a CQI Difference (CQIDIF) memory unit configured to store a predetermined number of differences between consecutive pieces of the collected channel information of the MS;
   a CQI averaging unit configured to calculate an average value of the collected channel information of the MS;

a first comparator configured to compare whether the average value of the collected channel information is included in a first threshold range;

a CQIDIF variance unit configured to calculate a variance of the differences between consecutive pieces of the collected channel information of the MS if the average value of the channel information is included in the first threshold range; and a second comparator configured to compare the variance of the differences between consecutive pieces of the collected channel information with a second threshold to determine whether to perform at least one of regulating a modulation and coding scheme (MCS) and switching a Multiple Input Multiple Output (MIMO) operation mode.

2. The apparatus of claim 1, further comprising:
a CQI storage unit configured to store the collected channel information of the mobile station (MS).

3. The apparatus of claim 1, wherein, if the average value of the channel information does not satisfy the second threshold, second comparator determines that a Rician channel is not identified.

4. The apparatus of claim 3, wherein, if the variance of the differences between two consecutive pieces of channel information satisfies the second threshold;
the second comparator determines that the Rician channel is identified,
the MCS is regulated when the wireless communication system supports Orthogonal Frequency Division Multiplexing (OFDM), and
the MIMO operation mode is switched when the wireless communication system supports multiple antennas.

5. A method of estimating a channel in a wireless communication system, the method comprising:
collecting a predetermined number of channel information of a mobile station (MS);
storing a predetermined number of differences between consecutive pieces of the collected channel information of the MS;
calculating an average value of the collected channel information of the MS;
comparing whether the average value of the collected channel information is included in a first threshold range;
calculating a variance of the differences between two consecutive pieces of the collected channel information of the MS if the average value of the channel information is included in the first threshold range; and
comparing the variance of the differences between two consecutive pieces of the collected channel information with a second threshold to determine whether to perform at least one of regulating a modulation and coding scheme (MCS) and switching a Multiple Input Multiple Output (MIMO) operation mode.

6. The method of claim 5, further comprising:
storing the collected channel information of the mobile station (MS) in a CQI storage unit.

7. The method of claim 5, wherein, if the average value of the channel information does not satisfy the second threshold, the Rician channel is not identified.

8. The method of claim 5, wherein, if the variance of the differences between two consecutive pieces of the collected channel information satisfies the second threshold:
the Rician channel is identified,
the MCS is regulated when the wireless communication system supports Orthogonal Frequency Division Multiplexing (OFDM), and
the MIMO operation mode is switched when the wireless communication system supports multiple antennas.

9. A method of identifying a Rician channel to be used in an Orthogonal Frequency Division Multiplexing (OFDM)-based communication system, the method comprising:
receiving channel information a mobile station (MS);
determining whether the Rician channel is identified based on a variance of differences between consecutive values of the received channel information of the MS;
selecting a Modulation & Coding Scheme (MCS) level based on the received channel information of the MS; and
regulating the selected MCS level according to whether the Rician channel is identified,
wherein determining whether the Rician channel is identified based on the received channel information of the MS comprises:
calculating an average value of the received channel information of the MS,
comparing whether the average value of the received channel information is included in a first threshold range, and
calculating the variance of differences between consecutive values of the received channel information if the average value of the received channel information is included in the first threshold range, and
wherein the Rician channel is determined to be identified if the variance of differences satisfies a second threshold.

10. The method of claim 9, wherein:
regulating the selected MCS level comprises increasing the MCS level up to a predetermined level if the Rician channel is identified, and
if the Rician channel is not identified, the selected MCS level is not regulated.

11. The method of claim 9, further comprising transmitting data according to the regulated MCS level.

12. An apparatus for identifying a Rician channel to be used in an Orthogonal Frequency Division Multiplexing (OFDM)-based communication system, the apparatus comprising:
a channel discriminator configured to receive channel information of a mobile station (MS) and determine whether a Rician channel is identified based on variance of differences between consecutive values of the received channel information of the MS;
a Modulation & Coding Scheme (MCS) selector configured to select an MCS level based on the received channel information of the MS; and
an MCS regulator configured to regulate the selected MCS level according to whether the Rician channel is identified,
wherein the channel discriminator determines whether the Rician channel is identified by:
calculating an average value of the received channel information of the MS,
comparing whether the average value of the received channel information is included in a first threshold range, and
calculating the variance of differences between consecutive values of the received channel information if the average value of the received channel information is included in the first threshold range, and
wherein the Rician channel is determined to be identified if the variance of the differences satisfies a second threshold.

13. The apparatus of claim 12, wherein the MCS regulator regulates the selected MCS level by increasing the MCS level up to a predetermined level if the Rician channel is identified, and does not regulate the selected MCS level if the Rician channel is not identified.

14. The apparatus of claim 12, further comprising a transmitter configured to transmit data according to the regulated MCS level.

15. A method of identifying a Rician channel to be used in a multiple antenna system, the method comprising:
receiving channel information for a mobile station (MS);
determining whether the Rician channel is identified based on a variance of between consecutive values of the received channel information of the MS; and
switching a Multiple Input Multiple Output (MIMO) operation mode on whether the Rician channel is identified,
where determining whether the Rician channel is identified comprises:
calculating an average value of the received channel information of the MS,
comparing whether the average value of the received channel information is included in a first threshold range, and
calculating the variance of the differences between consecutive values of the received channel information if the average value of the received channel information is included in the first threshold range, and
wherein the Rician channel is determined to be identified if the variance of the differences satisfies a second threshold.

16. The method of claim 15, further comprising transmitting data according to the MIMO operation mode.

17. The method of claim 15, wherein the MIMO operation mode is one of a Spatial Multiplexing (SM) mode and a Space-Time Block Code (STBC) mode, and
wherein switching the MIMO operation mode comprises:
switching to the STBC mode if the Rician channel is identified, and
switching to the SM mode if the Rician channel is not identified.

18. An apparatus for identifying a Rician channel to be used in a multiple antenna system, the apparatus comprising:
a channel discriminator configured to receive channel information of a mobile station (MS) and determine whether the Rician channel is identified based on a variance of differences between consecutive values of the received channel information of the MS; and
a Multiple Input Multiple Output (MIMO) switching unit configured to switch a MIMO operation mode based on whether the Rician channel is identified,
wherein the channel discriminator determines whether the Rician channel is identified by:
calculating an average value of the received channel information of the MS,
comparing whether the average value of the received channel information is included in a first threshold range, and
calculating the variance of differences between consecutive values of the received channel information if the average value of the received channel information is included in the first threshold range, and
wherein the Rician channel is determined to be identified if the variance of differences satisfies a second threshold.

19. The apparatus of claim 18, further comprising a MIMO transmitter configured to transmit data according to the MIMO operation mode.

20. The apparatus of claim 18, wherein the MIMO operation mode is one of a Spatial Multiplexing (SM) mode and a Space-Time Block Code (STBC) mode, and
wherein switching the MIMO operation mode comprises:
switching to the STBC mode if the Rician channel is identified, and
switching to the SM mode if the Rician channel is not identified.

* * * * *